United States Patent
Chen et al.

(10) Patent No.: US 10,725,974 B2
(45) Date of Patent: Jul. 28, 2020

(54) SYSTEMS, DEVICES AND METHODS FOR MANAGING FILE SYSTEM REPLICATION

(71) Applicant: Huawei Technologies Co., Ltd., Shenzhen (CN)

(72) Inventors: Chen Chen, Markham (CA); Jin Chen, Thornhill (CA); Xiaodi Ke, Markham (CA); Lei Guo, Markham (CA); Chong Chen, Richmond Hill (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 111 days.

(21) Appl. No.: 15/358,936

(22) Filed: Nov. 22, 2016

(65) Prior Publication Data

US 2018/0143996 A1 May 24, 2018

(51) Int. Cl.
*G06F 16/30* (2019.01)
*G06F 16/178* (2019.01)
*G06F 16/11* (2019.01)

(52) U.S. Cl.
CPC .......... *G06F 16/178* (2019.01); *G06F 16/122* (2019.01)

(58) Field of Classification Search
CPC .................................................. G06F 16/178
See application file for complete search history.

(56) References Cited

U.S. PATENT DOCUMENTS

| | | | |
|---|---|---|---|
| 5,666,532 A | 9/1997 | Saks et al. | |
| 9,740,413 B1* | 8/2017 | Balakrishnan | G06F 3/0689 |
| 2003/0126247 A1* | 7/2003 | Strasser | G06F 11/1458 709/223 |
| 2004/0064488 A1* | 4/2004 | Sinha | G06F 11/1451 |
| 2007/0061379 A1* | 3/2007 | Wong | G06F 17/30575 |
| 2012/0023369 A1* | 1/2012 | Bourbonnais | G06F 11/1474 714/16 |
| 2012/0185447 A1* | 7/2012 | Zhang | G06F 17/30156 707/693 |
| 2013/0282785 A1 | 10/2013 | Besen et al. | |
| 2014/0372376 A1 | 12/2014 | Smith et al. | |
| 2017/0031946 A1* | 2/2017 | Sarab | G06F 17/30156 |

FOREIGN PATENT DOCUMENTS

| | | |
|---|---|---|
| CN | 1852209 A | 10/2006 |
| CN | 102063306 A | 5/2011 |
| CN | 105045820 A | 11/2015 |
| CN | 105306581 A | 2/2016 |
| EP | 2701083 A1 | 2/2014 |

* cited by examiner

*Primary Examiner* — Mahesh H Dwivedi
(74) *Attorney, Agent, or Firm* — Slater Matsil, LLP

(57) ABSTRACT

A method for managing file system replication can include: collecting event data associated with file system events, each of the file system events indicative of a modification of at least one file at a first file system location; for each of the file system events, generating at least one file system action to apply the modification of the at least one file at the first file system location to at least one corresponding file at a second file system location; storing the at least one generated file system action in an action buffer; identifying dependencies between file system actions in the action buffer; and scheduling the file system actions in the action buffer for execution based on the dependencies.

21 Claims, 14 Drawing Sheets

| EVENT | ACTION |
|---|---|
| CreateEvent<br>new test.xml of 20G in src | CreateAction<br>copy test.xml from src to dst |
| AppendEvent<br>append 10G for test.xml in src | AppendAction<br>get new 10G from test.xml in src and append it to test.xml in dst |
| CloseEvent<br>close file test.xml, which occurs after CreateEvent or AppendEvent | CloseAction<br>check test.xml in src and dst and enforce consistency |
| RenameEvent<br>conf.tmp -> conf.xml in src | RenameAction<br>conf.tmp -> conf.xml in dst |
| UnlinkEvent<br>remove test.xml in src | UnlinkAction<br>remove test.xml in dst |
| MetadataUpdateEvent<br>chmod u+x conf.xml in src | MetadataUpdateAction<br>chmod u+x conf.xml in dst |

FIG. 3

Src-dst snapshot diff:
Modified, dfs://src/sys.log
Created, dfs://src/java
Deleted, dfs://src/data.tmp

Sync:
AppendAction dfs://dst/sys.log
CreateAction, dfs://dst/java
UnlinkAction, dfs://dst/data.tmp

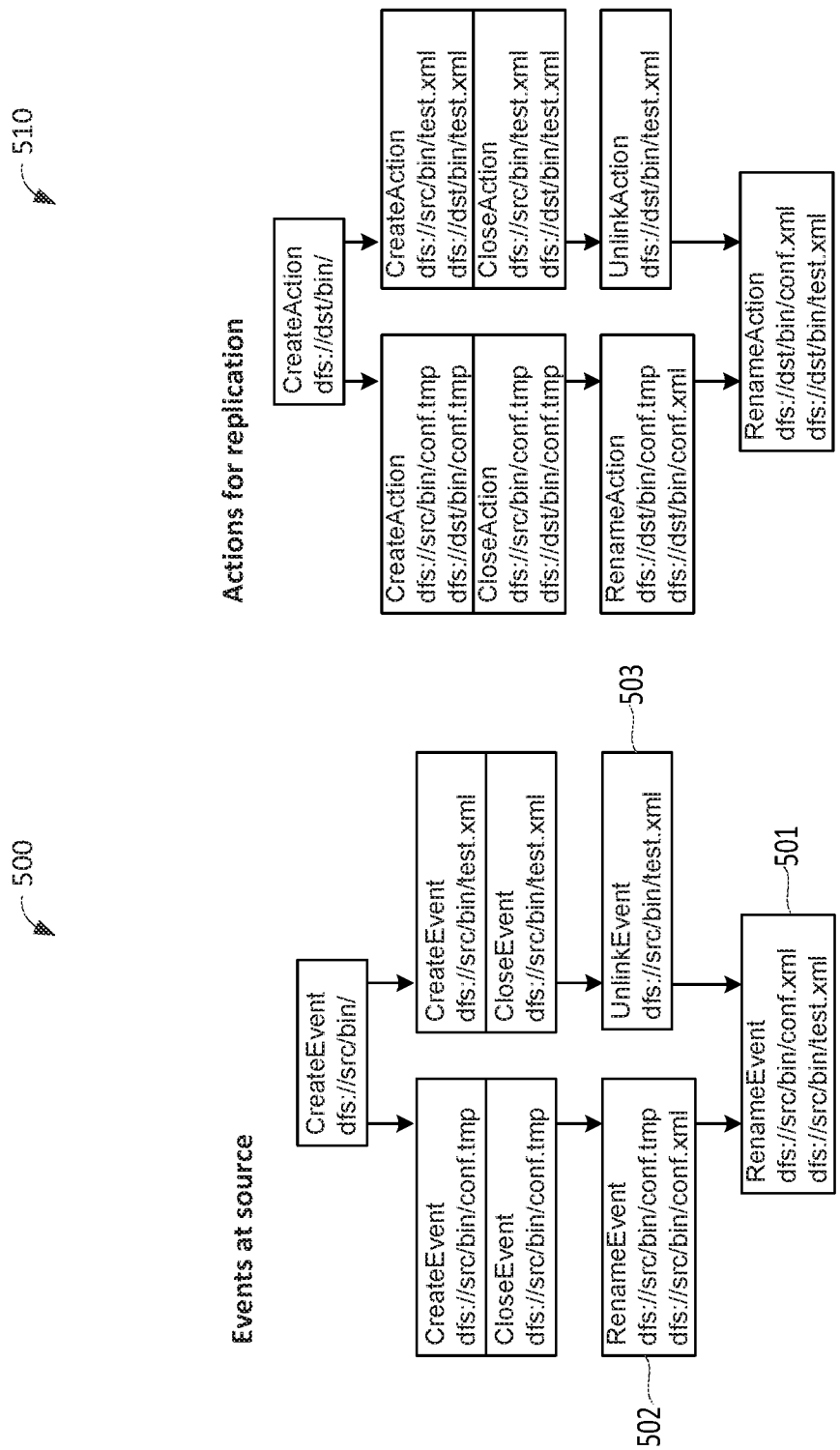

| |
|---|
| Action Generator Process |
| Input: E, a stream of event data |
| Output: A, a sequence of actions to be scheduled and executed |
| |
| 1 for each event e in E |
| 2     action a <- convert action from event e |
| 3     add a to A |
| 4     update existing actions in A (and hence R) that a impacts |

FIG. 8A

| |
|---|
| if a is of RenameAction<br>    update paths for related actions<br><br>a = Rename src/ -> src1/<br>then for all actions in A, update src/ to src1/ if applicable |
| If a is of UnlinkAction<br>    cancel preceding file shipping actions (e.g. create or append)<br><br>a = Unlink src/<br>then for all preceding create/append actions under src/ can be cancelled |

FIG. 8B

```
Ready Filter Process
Input: A, an ordered sequence of actions collected so far
Output: R, a set of ready-to-run and independent actions 1 repeat forever
2      for each ordered action a in A
3            resolve readiness of action a
4            if a is ready
5                  add a to R
```

FIG. 9A

```
Resolve readiness of action a
3.1 Compute dependencies for all actions causally related to action a
3.2 Check if action a has any precedence constraint to follow
```

FIG. 9B

```
Action reorganization process
Input: A, an ordered sequence of actions collected so far
Output: R, a set of ready-to-run and independent actions 1  repeat forever
2      reorganize A to improve performance subject to semantics
3      for each ordered action a in A
4          resolve readiness of action a
5          if a is ready
6              add a to R
```

FIG. 10A

```
Batch optimization process
Input: A, an ordered sequence of actions collected so far
Output: R, a set of ready-to-run and independent actions 1  repeat forever
2      wait until A is sufficiently large for batch optimization
3      for each ordered action a in A
4          resolve readiness of action a
5          if a is ready
6              add a to R
```

FIG. 10B

| |
|---|
| Execution Scheduler Process |
| Input: R, a set of ready-to-run (and thus independent) actions<br>X, a set of available executors |
| Output: 1. P, an execution plan that assign actions to executers<br>2. S, execution results reported back to upper layers of Action Generator and Ready Filter |

FIG. 11A

| |
|---|
| Report Feedback Process<br>Upon success for action a<br>    remove a from A and R, which impacts readiness for other actions<br><br>Upon exception for action a<br>    1. identify reason for exception (e.g. subsequent rename or delete)<br>    2. update A and R |

FIG. 11B

SYSTEMS, DEVICES AND METHODS FOR MANAGING FILE SYSTEM REPLICATION

FIELD

This disclosure relates to file systems, and more particularly, to, devices, methods and computer-readable media for distributed file systems.

BACKGROUND

Big data or geo-distributed applications can utilize distributed file systems across multiple data centers or locations. This may require the replication of files across different machines.

With scaling, geo-distributed data centers potentially having large network latencies and large file sizes, managing replication lag times and resources can be a challenge.

SUMMARY

In accordance with one aspect of the present disclosure, there is provided a method for managing file system replication. The method includes: collecting event data associated with file system events, each of the file system events indicative of a modification of at least one file at a first file system location; for each of the file system events, generating at least one file system action to apply the modification of the at least one file at the first file system location to at least one corresponding file at a second file system location; storing the at least one generated file system action in an action buffer; identifying dependencies between file system actions in the action buffer; and scheduling the file system actions in the action buffer for execution based on the dependencies.

In accordance with another aspect of the present disclosure there is provided a system for managing file system replication. The system includes: at least one processor. The at least one processor is configured for: receiving event data associated with file system events, each of the file system events indicative of a modification of at least one file at a first file system location; for each of the file system events, generating at least one file system action to apply the modification of the at least one file at the first file system location to at least one corresponding file at a second file system location; storing the at least one generated file system action in an action buffer; identifying dependencies between file system actions in the action buffer; and scheduling the file system actions in the action buffer for execution based on the dependencies.

In accordance with another aspect of the present disclosure there is provided a non-transitory, computer-readable medium or media having stored thereon computer-readable instructions. The instructions, which when executed by at least one processor, configure the at least one processor for: receiving event data associated with file system events, each of the file system events indicative of a modification of at least one file at a first file system location; for each of the file system events, generating at least one file system action to apply the modification of the at least one file at the first file system location to at least one corresponding file at a second file system location; storing the at least one generated file system action in an action buffer; identifying dependencies between file system actions in the action buffer; and scheduling the file system actions in the action buffer for execution based on the dependencies.

Many further features and combinations thereof concerning the present improvements will appear to those skilled in the art following a reading of the instant disclosure.

DESCRIPTION OF THE FIGURES

FIG. 3 is a table showing examples of file system events and example corresponding actions.

FIG. 4A shows an example difference list based on a snapshot of a source location and a destination location.

FIG. 4B is a table showing example actions corresponding to the difference list of FIG. 4A.

FIG. 5A is a diagram showing an example flow of file system events, and FIG. 5B is a diagram showing a flow of example corresponding file system actions.

FIGS. 8A and 8B show pseudocode of example action generator processes.

FIGS. 9A and 9B show pseudocode of example ready filter processes.

FIGS. 10A and 10B show pseudocode of example reorganization and batch optimization processes.

FIGS. 11A and 11B show pseudocode of example execution scheduler report feedback processes.

These drawings depict aspects of example embodiments for illustrative purposes. Variations, alternative configurations, alternative components and modifications may be made to these example embodiments.

DETAILED DESCRIPTION

As more applications and data storage migrate to networked and cloud based systems, the management of distributed data systems can involve many different physical, logical and/or geographic machine locations. In some instances, this involves the replication of files across different machines, clusters or data centers.

Figure 1:
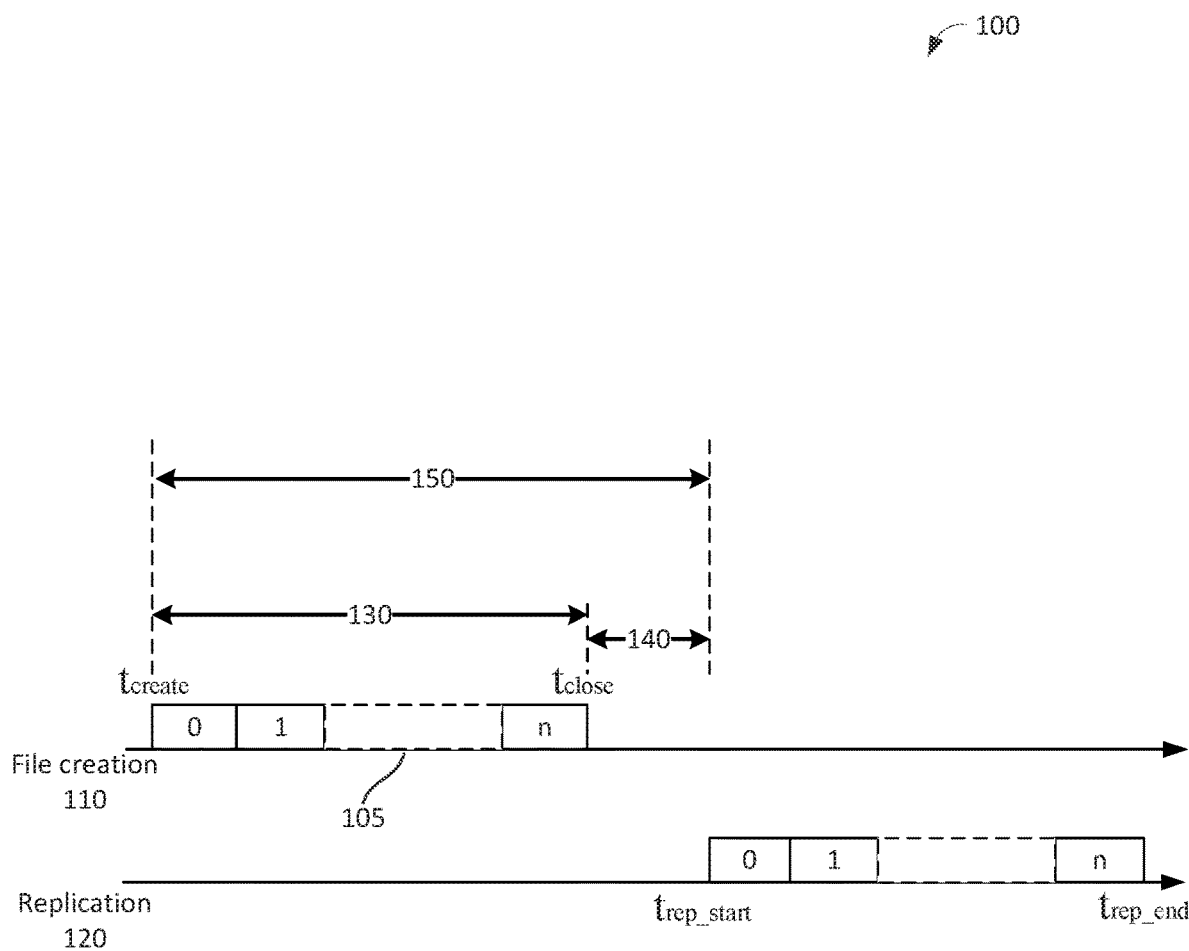
FIG. 1 is a timeline of an example replication process.

FIG. 1 shows a timeline of an example replication process. At time $t_{create}$, a file 105 is created 110 at a source location. After the file 105 has been created, it is closed at time $t_{close}$. In some systems, a distributed copy command is invoked on demand or based on a schedule. For example, after the file 105 is created and closed, the file system may be manually instructed to distribute the file 105 to a second location; or based on a regular schedule, the system may check for any closed files that have been modified and trigger a distributed copy command.

In some instances, depending on the timing of the closing of the file 105 and the timing of the scheduled modified file check, there may be a delay 140 between the closing of the file and the start of the replication process 120 at time $t_{rep\_start}$. In some data systems, files can be large, for example on the scale of multiple Gigabytes or Terabytes. In some instances, the creation of such large files can result in a large delay 130 from $t_{create}$ to $t_{close}$. Even if the replication lag 140 ($t_{close}$ to $t_{rep\_start}$), which may be dependent on network and system resources, is relatively small, the large creation time 130 can result in a large lag 150 between starting to create a file and starting its replication.

In some instances, replication of a large file can consume a lot of system and network resources. For example, memory and network capacities may be consumed by a single or a small number of large file replications. This may result in a queuing and delay of other replication tasks.

In systems which periodically or otherwise batch distributed copy commands on a schedule, it may be a challenge to provide a guaranteed or estimated replication lag time because the system is unaware of how many file operations will be conducted in any given time period.

In some embodiments, the systems and methods described herein may manage file replications by monitoring file events. In some instances, this may allow for the separation of replication control flows and the data being replication. In some instances, some embodiments may allow for the replication of portions of a file before the file has been closed.

Figure 2:
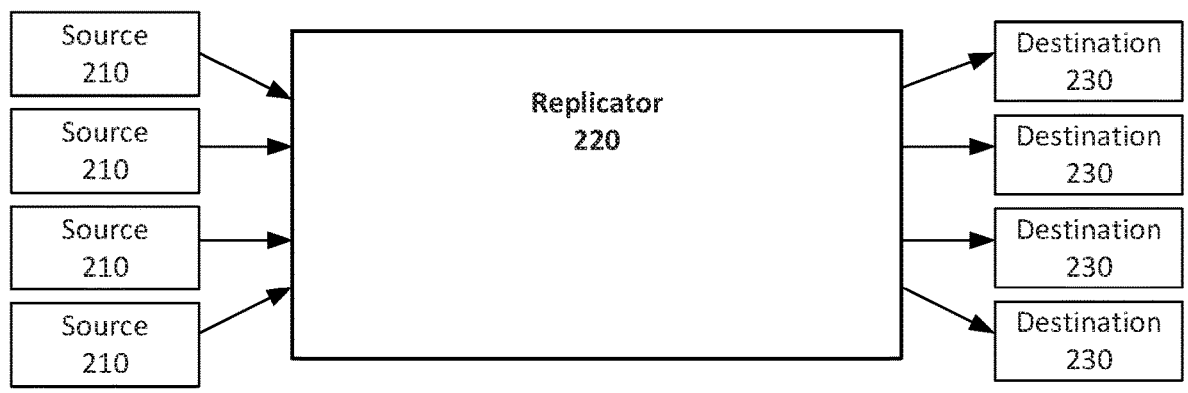
FIG. 2 is a diagram showing aspects of an example computing system.

FIG. 2 illustrates aspects of an example computing system 200 to which aspects of the present disclosure can be applied. The system includes one or more source locations 210, and one or more destination locations 230 communicably connected to a replicator 220. In some embodiments, the source and destination locations 210, 230 may be part of one or more distributed, clustered or other file systems involving the replication of files at different machines. In some embodiments, source and destination locations may be part of different file systems.

As illustrated in FIG. 2, machines at source locations 210 generate event data associated with file system events modifying one or more files at the respective source locations 210. These file system events are communicated to the replicator 220. For each file system event communicated to the replicator, the replicator is configured to generate file system actions to be performed at one or more destination locations 230 to replicate the modification of the one or more files at the source location. The file system actions are scheduled and then communicated to the appropriate machines at destination locations 230 for execution.

Source locations 210 and/or destination locations 230 can be at any machine including any device(s) and/or system(s) which can generate file system event data, and/or receive and process file system actions. For example, a source machine location 210 and/or destination machine location 230 can include any device or system including or otherwise interacting with a data storage component that may be part of one or more distributed file systems.

Although the locations 210, 230 in FIG. 2 are labelled as source and destination, machines at particular locations are not necessarily limited to source or destination roles. In some embodiments, a machine or location which is a destination for one file replication process may be a source for another file replication process, and a machine or location which is a source for one file replication process may be a destination for another file replication process.

In some embodiments, source and destination locations 210, 230 can include machines having any combination of hardware and software components. For example, source/destination machines may include any individual or combinations of computing devices, processors, networks, memories, storage devices, network devices, and the like. In some embodiments, source/destination machines may be or may include data centers, mainframes, racks, servers, virtual machines in the cloud, and the like. In other embodiments, source/destination machines may be individual devices which are logically or physically part of data centers, mainframes, racks, servers, and the like. In different embodiments, different source and/or destination machines may utilize different operating systems and/or file systems.

The computing system 200 may include one or more processors in a single machine or split across any number of machines/devices in the computing system 200. These processors can be configured to handle file system operations and communications in the computing system 200.

In some embodiments, the computing system 200 includes a replicator 220 for managing files in a distributed file system which may be part of the computing system 200. In some embodiments, the replicator 220 is configured for receiving event data from source machine(s) 210, and generating and scheduling file system actions for execution at destination machine(s) 230.

In some embodiments, a replicator 220 is implemented as one or more processors running a replication service or other applications. In some embodiments, the replicator 220 may be implemented on a separate server or other machine that is networked with the machines at the source and destination locations 210, 230. The replicator 220 may also be implemented on or within any suitable device(s) in the system 200. For example, in some embodiments, the replicator 220 may be implemented on or within source machine(s) and/or destination machine(s).

In some embodiments, the replicator 220 may be distributed across a number of devices in the system. For example, the functions or services provided by the replicator 220 may be distributed across processor(s) at any number of machines and locations in the system 200.

The machine locations 210, 230 and replicator 220 may be connected via any suitable connections including over communication networks. For example, machines and replicators 220 can be connected by one or more physical and/or logical networks and network devices, or interconnections within a data center/device/rack/etc.

Irrespective of the number or configuration of devices, networks, hardware, software and/or other resources in the computing system 200, in some embodiments, the computing system 200 may be configured to appear as a single file system interface to client devices which are accessing files at a source or destination machine.

In some instances, example embodiments described herein or otherwise, may provide a solution for providing eventual file consistency between source and destination location(s). In some instances, file system may be eventually synchronized while handling a potential continuum of events.

FIG. 3 is a table 300 showing examples of file system events which may occur at a source machine and corresponding actions for replicating events at destination machine(s). For example, "CreateEvent" represents an example file system event which creates a new file (such as "test.xml") at a source machine. The corresponding "CreateAction" generated by the replicator includes an instruction to copy the file from the source machine to one or more destination machines that have been mapped or are otherwise configured to replicate files from the source machine.

Other example file system events include appending data to a file ("AppendEvent" which generates "AppendAction"), closing a file ("CloseEvent" which generates "CloseAction"), moving/renaming a file ("RenameEvent" which generates "RenameAction"), removing/deleting a file ("UnlinkEvent" which generates "UnlinkAction"), changing file permissions or other file metadata ("MetadataUpdateEvent" which generates "MetadataUpdateAction"), modifying a file (e.g. overwriting, random writing—not shown).

In some embodiments, other file system events can trigger the generation of event data as part of the replication process. Generally, file system events can include any event, such a file mutation or file modification event, which is indicative of the modification of data of at least one file at the source machine. In some embodiments, these events can trigger the generation of event data. For the purposes of this specification, events indicative of the modification of data of a file should be understood as including creating a new file, modifying the data of an existing file, adding to a file, truncating or shortening a file, deleting a file, copying a file, moving a file, etc. Modifying data of a file should also be understood as including modifying the file's contents and/or the file's metadata such as permissions, ownership, timestamps, etc.

In some embodiments, modifying a file should also be understood as including the modification of a directory irrespective of whether the machine's file system actually treats directories as a file. As the modification of directories, paths, folders, etc. can, in some instances, require replication in a distributed file system, unless not applicable, references to the modification of file(s) should encompass directories and the like.

In some embodiments, modifying a file should be also understood as including modification of a link, device file, or any other type of file or file-like object.

In some instances, a single file system instruction can affect a single file. For example, a create-file instruction may cause the creation of a single file which can be considered as a single file system event. In other instances, batch, recursive, iterative, wildcard instructions and the like can affect multiple files. In such instances, the system may consider these to be a number of single events each affecting a single file, or as one or more events affecting multiple files. In some embodiments, the system's ability to handle multi-file events may depend on the ability of destination machines to handle corresponding actions generated by the duplicator.

In some embodiments, a single file system event can trigger the generation of multiple actions. In some embodiments, actions can trigger the generation of subsequent actions.

In some embodiments, file system events can include system events which require the synchronization of two or more machines. For example, such system events may include a startup, reset, failure recovery, or network reconnection of a machine; a new file mapping to a machine; etc. In some embodiments, upon receipt of event data indicating that one of these file system events has occurred, the replicator is configured to generate a series of actions to synchronize two or more machines. For example, a synchronization action can include generating a file system snapshot of the files of the affected two (or more) mapped machines, determining a difference between the snapshots, and generating actions to replicate the changes.

For example, if the system determines that the differences between the snapshot of the files at a source machine and a destination machine could have been caused by the example events 400 illustrated in FIG. 4A, the replicator generates the example actions 410 in FIG. 4B to synchronize the source and destination machines.

In some instance, file system events such as the startup of a machine may not actually require any synchronization if the starting up machine is up-to-date; however, because the file system may not be initially aware of the up-to-date status, such file system events are, in some embodiments, handled as being indicative of a modification of one or more files.

In some instances, file system events may occur concurrently and/or may occur in an order which may create dependencies between actions. For example, FIG. 5A shows an example sequence of events 500 which occur at a source machine. Some of these events in different branches (as illustrated by the two arrow paths) may occur concurrently or otherwise independently of each other. However, the final RenameEvent 501 which renames file "conf.xml" to "test.xml" is only able to complete successfully because it occurs after RenameEvent 502 and UnlinkEvent 503. Accordingly, the system and replicator are configured to handle dependencies between actions for replicating the events.

FIG. 5B shows an example sequence of actions 510 which are generated by the replicator. As described herein, in some embodiments, actions may be rearranged and/or redundant or related actions may be pruned or condensed. In some instances, this may reduce the number of actions to be executed, which may reduce resource usage and/or replication times.

Figure 6:
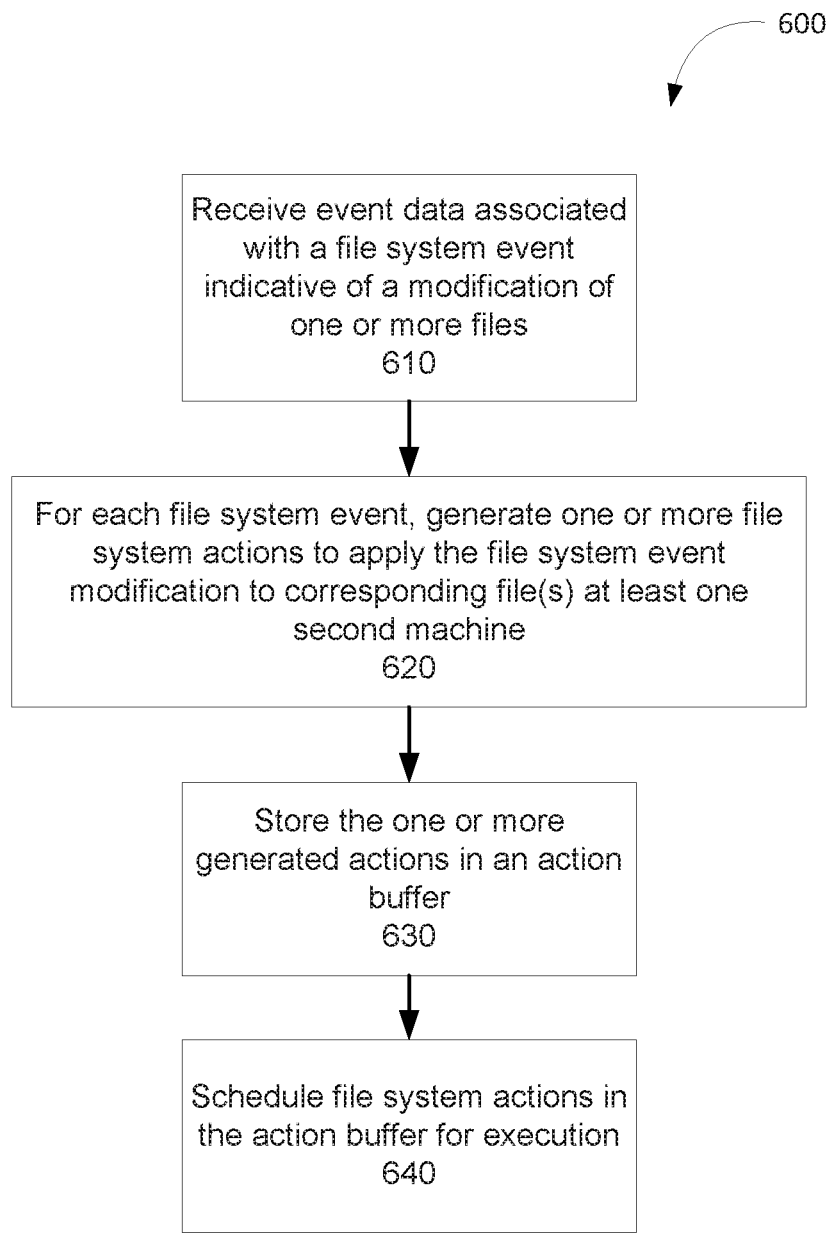
FIG. 6 is a flowchart showing aspects of an example method for managing file system replication.

FIG. 6 is a flowchart showing aspects of an example method 600 for managing file replication. At 610, one or more processors receive event data associated with one or more file system events. These events can include any file system command, operation, status change or the like which would require an action to be performed in order to maintain consistency of files between a first location and a second location. For example, a file system event can be indicative of a modification of one or more files at a first location which would then have to be replicated at the second location to maintain consistency between files on the two machines. In some embodiments, a file system event can include a new mapping between machines (e.g. add a redundancy to a new machine); a machine power-on, reboot or network reconnection; or any other event which may require synchronization actions to make the newly mapped or newly available machine up-to-date. Other example events are shown in FIGS. 3 and 5A.

In some embodiments, a file location can include a file name, path name, network location, machine reference, link, IP or other address, and the like, or any combination thereof.

In some embodiments, event data can include one or more fields, flags, identifiers and the like. In some embodiments, the event data can include data identifying event types/commands, filenames, file metadata and the like.

In some embodiments, event data can be generated at the source machine. For example, the Linux™ inotify subsystem, a file alteration monitor subsystem, Mac OS X FSEvents API, and the like may be used to monitor and/or generate event data. In some embodiments, periodic or on-demand file system snapshots can be taken and compared to previous snapshots to identify changes to the file system and generate event data. In some embodiments, a combination of file monitoring/notification systems and snapshot comparisons can be used.

In some embodiments, the processor(s) can receive, collect or otherwise obtain the event data from the source machine over a network or other connection. In embodiments where the processor(s) are at the source machine, they can receive or otherwise obtain the event data directly.

At 620, the processor(s) generate one or more file system actions for each of the file system events associated with the received event data. In some embodiments, the file system actions can include one or more file system commands, operations, or other data for instructing one or more processors in the system to perform to apply any modifications to file(s) at a source location to one or more destination location(s). In some embodiments, a file system action is generated by converting event data. For example, a "CreateEvent" command which may create a new file at a source machine can be converted into a "CreateAction" command which may copy the new file at the source machine to the destination machine(s).

In some embodiments, a file system action is generated by mirroring event data. For example, a "RenameEvent" command which may rename a file at a source location but not change any of its contents can be mirrored with a "RenameAction" which renames the corresponding file at the destination location(s).

As described herein or otherwise, in some embodiments, a single event may trigger the generation of multiple actions.

In some embodiments, a file may have more than two copies at various locations in the system. This may require that a single event be replicated at multiple destination locations. In some embodiments, the processor(s) generate multiple actions to replicate a particular event at each of the multiple destination locations.

In some embodiments, actions can include one or more operators, parameters, source(s), destination(s), fields, flags, identifiers, filenames, metadata and the like.

In some embodiments, rather than including the actual data contents that have been modified, actions include file location information identifying where the modified data can be accessed at the first machine. For example, an action can include filenames, paths, network addresses, links, and the like. Similarly, in some embodiments, event data also includes file location information rather than including the actual data contents that have been modified.

In some instances, this may reduce the amount of memory required to buffer or otherwise store event and/or action data which it is being processed. In some instances, this may also reduce network utilization because the modified data is transferred directly from the source machine to the destination machine rather than from the source machine to the replicator, then from the replicator to the destination machine.

In some embodiments, when file metadata is the data being modified, this information may be included in event and/or action data. For example, data for renaming a file or changing permissions may be included in event and/or action data.

At 630, the processor(s) store the generated actions in an action buffer. In some embodiments, the action buffer may be one or more memories, and may be in any suitable data structure or format. In some embodiments, the action buffer may be ordered or may otherwise include timestamps, order positions, or other information for identifying the order in which actions were generated. In some embodiments, the actions are ordered or otherwise stored so as to maintain dependencies or otherwise avoid the violation of dependencies between actions.

At 640, the processor(s) schedule the actions in the action buffer for execution. In some embodiments, the processor(s) schedule actions for execution based on any number of factors including resource availability, fairness algorithms between different machines/users/processes/etc., factors for increasing parallelism/throughput, and the like. In some embodiments, the processors assign scheduled actions to one or more resources for executing the action. For example, actions may be assigned to processors, network resources, storage devices, and the like. In some embodiments, an action may be assigned particular ports, network bandwidth, storage device bandwidth, read/write permissions and the like.

In some embodiments, scheduling the actions in the action buffer includes identifying or otherwise determining which actions are ready for execution. In some embodiments, an action is not available for scheduling if it has a dependency on an earlier action that has not been successfully executed. For example, an action to append data to the end of file "example.txt", or to rename file "example.txt" would not be available for scheduling before a previous action which creates the "example.txt" file has completed.

In some embodiments, the processors are configured to identify dependencies when they are added to the action buffer. In other embodiments, dependencies can be identified before an action is scheduled for execution.

In some embodiments, the processors scan actions in the action buffer to determine whether a particular action is dependent on any actions which were added to the action buffer before the particular action. In some embodiments, this includes comparing filenames, links and/or other file identifiers included in the actions to identify actions which access or modify the same file. In some embodiments, determining dependencies also includes determining whether the action type creates a dependency or not.

In some embodiments, the processors are configured to store dependency information in a flag, link, parameter or the like in association with the corresponding actions. In some embodiments, as actions are completed or periodically, the processors can update the stored dependency information.

The processor(s) are configured to schedule, for execution, actions which have no outstanding dependencies and/or are otherwise ready for execution. In some embodiments, actions with no outstanding dependencies are those whose flags, links or other parameters indicate that the action has no dependencies.

In some embodiments, actions with no dependencies can be added, moved to, or otherwise stored in a ready-for-execution action buffer. In embodiments with this structure, the processors can select and schedule actions from this ready-for-execution action buffer.

Figure 7:
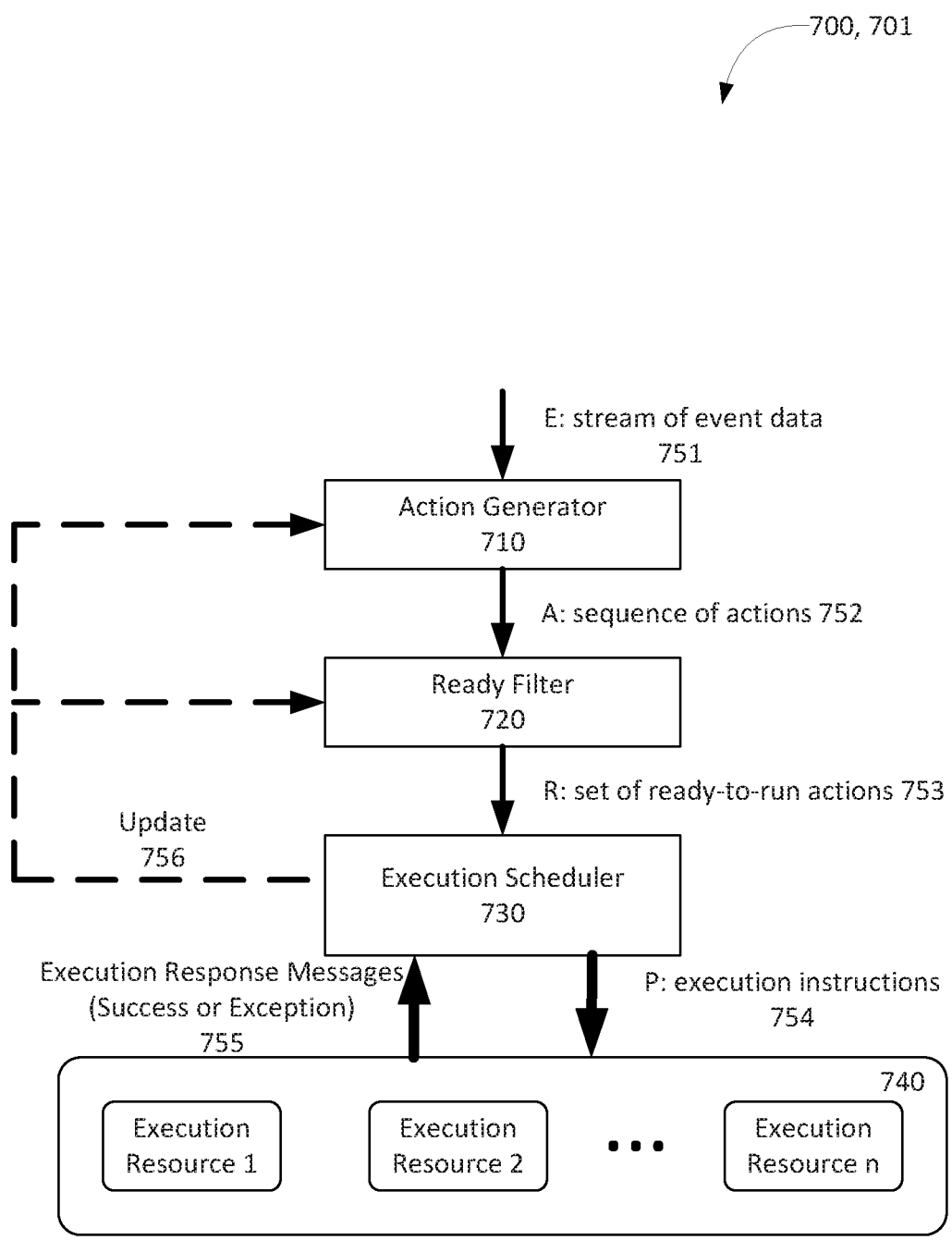
FIG. 7 is a flowchart showing aspects of an example control flow.

FIG. 7 shows a flowchart showing aspects of an example control flow 700 and an example system 701 for managing files in a distributed file system as described herein or otherwise. One or more processors in the system 701 are configured to implement an action generator 710, a ready filter 720 and an execution scheduler 730. In some embodiments, the action generator 710, ready filter 720 and/or the execution scheduler 730 may be part of a replicator 220.

FIG. 8A shows aspects of an example action generator process. As described herein or otherwise, the action generator 710 receives a stream of event data 751 from one or more machines in the system. The event data can be received at any time, for example, as events occur, periodically or with any other regular or irregular timing.

As described herein or otherwise, for each event identified in the event data 751, the action generator 710 converts the event data or otherwise generates one or more actions which are added to a sequence of actions 752 (e.g. stored in an action buffer).

In some embodiments, the action generator updates actions already in the sequence of actions. In some embodiments, the updates are based on the type of action being generated. FIG. 8B shows aspects of some example processes for updating actions in an action buffer when a new action is a rename or unlink action. For example, if a rename event is received indicating that a particular file has been renamed, the action generator updates all actions which reference the particular file with its new name. In some instances, because the particular file can no longer be referenced by its previous name, this ensures that the actions in the action buffer can be executed properly. In another example, if an unlink event is received, all preceding create or append actions can be cancelled as the source file has been deleted by the source machine.

As described herein or otherwise, a ready filter 720 filters or otherwise identifies which actions in the action buffer are ready for execution. In some embodiments, the identified actions define a set of ready-to-run actions 753.

FIGS. 9A and 9B show aspects of an example ready filter process. As described herein or otherwise, the ready filter 720 parses through or otherwise determines the readiness of actions for execution. In some embodiments, resolving the readiness of an action includes computing or otherwise identifying all actions in the action buffer which are related to a particular action. If the ready filter determines that the particular action has no precedence constraints from the related actions, the particular action is added to the set of ready-to-execute actions or is otherwise identified as being ready for execution.

FIGS. 10A and 10B show aspects of action reorganization and batch optimization processes which, in some embodiments, can be applied to any of the example methods and systems described herein.

In some embodiments, processor(s) associated with the replicator, action generator or ready filter, or otherwise any processor(s) in the system 200 are configured to reorder, combine, eliminate or otherwise reorganize actions in the action buffer.

For example, in some embodiments, the processor(s) may reorder actions based on available resources, to simplify the action buffer, or otherwise. For example, in some embodiments, the processor(s) may reorder actions to position non-data shipping actions (such as rename or unlink actions, which do not involve the transmission of file content data from the source location) before actions which involve the transmission of data from the source location to the destination location (e.g. create, append). In some instances, this may simplify/reduce the action buffer and/or reduce future readiness calculations.

In some embodiments, the processor(s) may combine, condense or eliminate related actions. In some embodiments, related actions may include actions which involve at least one common file. For example, two sequential append actions on the same file may be combined into a single larger append action. In another example, a rename action from "FileA.txt" to "FileB.txt", and a subsequent rename action from "FileB.txt" to "FileC.txt" may be combined into a single rename action from "FileA.txt" to "FileC.txt". In another example, an unlink action can condense, prune or otherwise eliminate previous actions because they may no longer be necessary if a file is to be ultimately deleted.

The processor(s) may be configured to similarly reorder, combine or condense/eliminate any other series of suitable actions. In some instances, by reorganizing actions in the action buffer, the resources and/or time required to complete all of the actions may be reduced.

In some embodiments, reordering, combining, eliminating or otherwise reorganizing actions in the action buffer includes ensuring that the reorganization observes or otherwise avoids violating any action dependencies.

As illustrated, for example, in FIG. 10B, in some embodiments, the processor(s) can be configured to delay the scheduling of actions and/or the reorganization process until a batch optimization trigger is detected. In some examples, the processor(s) detect a batch optimization trigger when the action buffer reaches or exceeds a defined size, after a defined time period has elapsed since the last scheduling/reorganization process has run, and/or when there are available resources to execute the actions.

As described herein or otherwise, the execution scheduler 730 schedules ready-to-execute actions for execution with one or more execution resources 740. In some embodiments, the scheduled actions define a series of execution instructions 754 for execution at one or more assigned resources.

FIG. 11A shows aspects of an example execution scheduling process. As described herein or otherwise, the processor(s) utilize one or more scheduling algorithms to schedule one or more actions which are identified by the system as ready-to-execute. In some embodiments, the scheduling may attempt to maximize performance by selecting, scheduling and/or assigning actions to maintain or meet a defined maximum, average and/or otherwise targeted replication lag time. In some embodiments, the scheduling may aim to maximize parallelism and/or maximize resource utilization. In some embodiments, the scheduling may be based on fairness to particular machines, mappings, users and the like. In some embodiments, the scheduling is based on available execution resources 740.

In some embodiments, execution resource(s) communicate execution response messages 755 to the distributed file system processor(s). In some embodiments, the execution response messages include data indicating whether an action was successfully executed. In some embodiments, the execution response messages can include a flag or code which indicates a successful execution or one or more error codes.

In some embodiments, the processor(s) traverse or otherwise check the action buffer to identify or otherwise determine whether any actions in the action buffer are related to or otherwise require updating in view of an execution response message.

In some embodiments, based on the execution response messages 755, the processor(s) update 756 the actions in the action buffer. In some embodiments, this can include updating both ready, and not ready-to-execute actions. FIG. 11B shows aspects of an example feedback/action buffer update process.

In some embodiments, upon receipt of a successful response message, updating the actions can include clearing or updating dependency fields, or otherwise resolving one or more dependencies for actions which were dependent on the completion of the successfully execution action.

In some embodiments, upon receipt of an unsuccessful response message, the processor(s) can attempt to identify a reason for the unsuccessful execution. In some embodiments, the processor(s) can add the unsuccessfully executed action back to the action buffer.

In some embodiments, the receipt and processing of response messages may, in some instances, allow the system to timely and/or accurately respond to execution results at destination locations.

Figure 12:
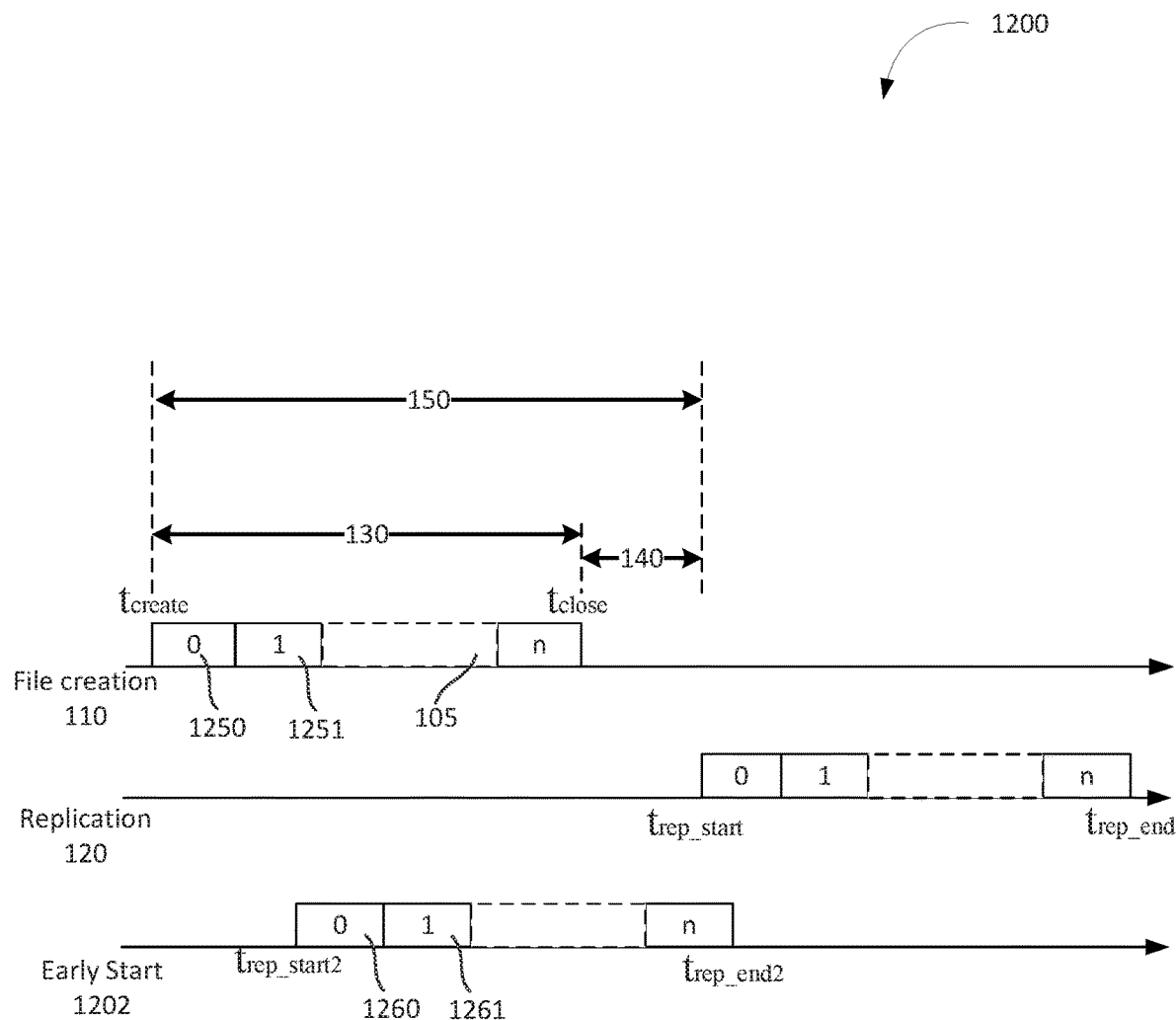
FIGS. 12 and 13 are timelines of example early start replication processes.

As described herein or otherwise, in some embodiments, an event can trigger the generation of a sequence of actions. FIG. 12 shows a timeline 1200 including an example "early start" replication process 1202 which can begin before a source file is closed.

In some embodiments, a data-shipping event such as a create event or an append event can trigger a replication process which begins before the source file has been closed.

In some embodiments, based on, for example the event type, the event data indicates that content data of a file at a source machine is being modified.

In some embodiments, upon receipt of event data identifying a data-shipping event (i.e. an event indicating that content data of one or more files at a source machine is being modified), the processor(s) generate a corresponding action (e.g. create or append) and initiate a thread or other process to monitor the current length of the file(s) being modified at the source machine. When the length of the content data being modified indicates that a new chunk of modified content data meets or exceeds a defined chunk size, a copy chunk action is generated and/or is identified as ready for execution. For example, in FIG. 12, file 105 is being created at a source machine. For illustrative purposes, file 105 is shown with n chunks of uniform length. As file 105 is being written at the source machine, a thread or other process monitors the current length of the file. When the file length indicates that the current file size exceeds a defined chunk size (delineated by the edge between chunks 0 (reference 1250) and 1 (reference 1251)), the processor(s) triggers the generation and/or readiness of a copy chunk action for copying chunk 0 to the destination machine. Continuing to monitor the current file length, when the current file length indicates that the not-yet-actioned portion of the modified data exceeds the defined chunk size, another copy chunk action is generated (e.g. to copy chunk 1 to the destination machine). In some embodiments, this process is repeated until close event data is received.

In some embodiments the defined chunk size may be based on resource capabilities and/or may be a size selected to control or reduce replication lag times. In some embodiments, the defined chunk size may be selected to reduce resource blocking that may otherwise be caused by a large bulk file transfer.

In some instances, the early start process 1202 and/or chunk replication can enable a large file to be replicated much more quickly than a replication process (e.g. 120) which cannot start until the source file has been closed. In some instances, the chunk replication of a file can also improve resource balancing between different file system events.

Figure 13:
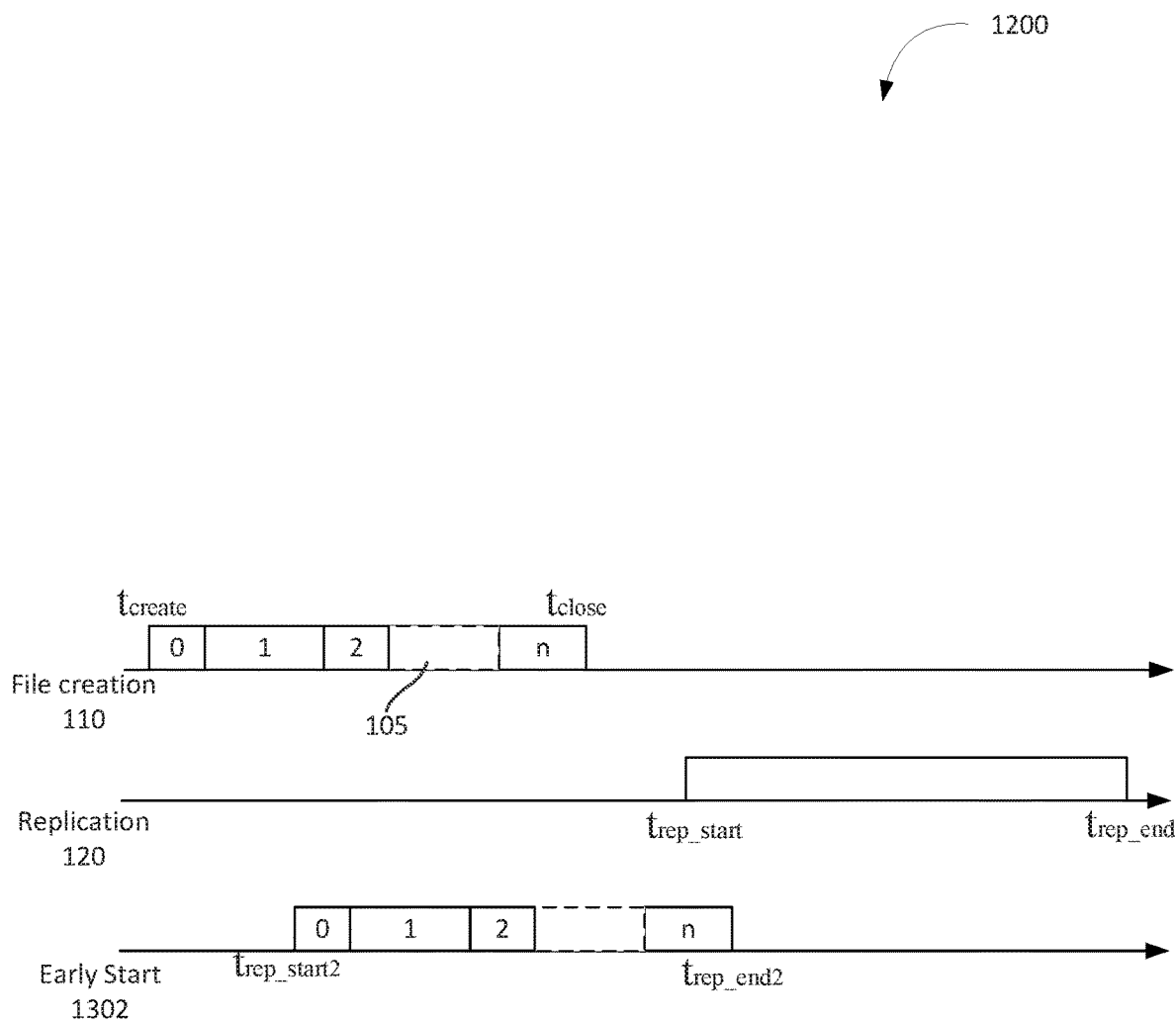

FIG. 13 shows a timeline 1300 showing another example "early start" replication process 1302 which can begin before a source file is closed. In this process, chunks copied by different copy chunk actions can be different sizes. Upon receipt of event data indicating that content data of one or more files at a source location is being modified, the processor(s) generate an initial chunk copy action to copy the initially available modified data to the destination location. For example, in FIG. 13, when the event data is processed, the file size of file 105 indicates that the chunk of modified data illustrated by chunk 0 is available for copying, and the processor(s) generate a copy chunk action to copy chunk 0 to the destination location. When an execution response message is received indicating that chunk 0 was successfully copied, the processor(s) generate a subsequent copy chunk action to copy the currently available and not yet copied portion of the modified data at the source location (e.g. chunk 1 of file 105). Depending on the replication lag and processing time, subsequent chunks may be different sizes. In some embodiments, this process is repeated until close event data is received. In some instances, this may require less monitoring of the length of the source file than the example process 1202 illustrated in FIG. 12.

Figure 14:
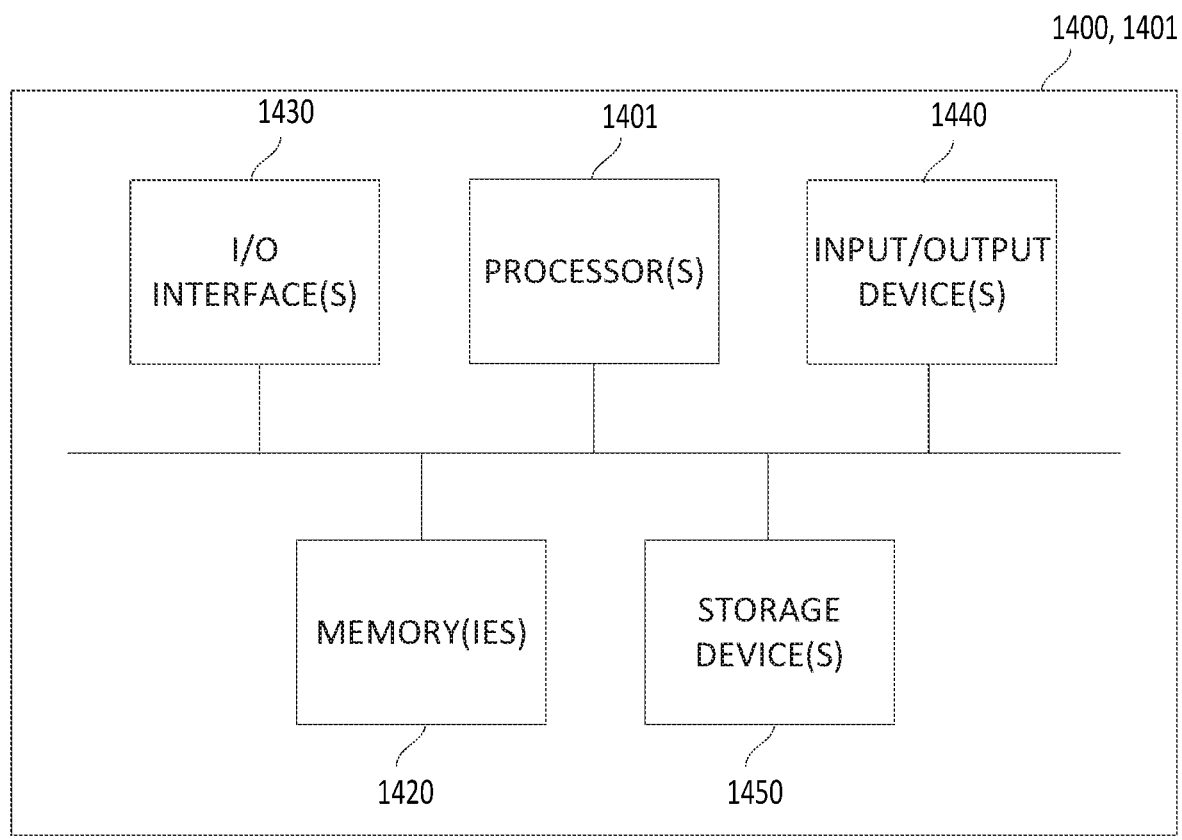
FIG. 14 is a diagram showing aspects of an example system or machine.

FIG. 14 shows a schematic diagram of an example computing system 1400 or example machines 1401 for managing file system replication.

In some embodiments, the computing system 1400 or machines 1401 may include one or more processors 1401, memory devices 1420, input/output interfaces 1430, input devices 1440, storage devices 1450 and/or any other components or mechanisms suitable for or involved in performing aspects of the methods and functions described herein.

In some embodiments, the computing system 1400 may include one or more machines 1401 or systems which provide the mechanisms, controls, devices and/or communication links to perform aspects of the methods and functions described herein. For example, the computing system 1400 may include one or more computers, servers and control devices configured for running file processes, reading or writing file data, sending communication messages, and controlling, monitoring or otherwise utilizing resources 1450. In some embodiments, an example machine 1401 or computing system 1400 may be a standalone computer, server, mobile device, mainframe, supercomputer, computing array or other computing device or devices configured for performing file system processes.

In some embodiments, storage devices 1450 can include any devices and/or media for storing files. Storage devices 1450 can include but are not limited to hard drives, solid state drives, magnetic tapes, disc drives, and/or any device suitable for the storage and retrieval of data.

In some embodiments, the storage devices 1450 may be accessed or monitored by client device(s) which may or may not be involved in the distributed file system replication processes.

Each processor 1401 may be, for example, any type of microprocessor or microcontroller, a central or graphics processing unit, a digital signal processing (DSP) processor, an integrated circuit, a field programmable gate array (FPGA), a reconfigurable processor, or any combination thereof.

Memory or storage devices 1420 may include one or a combination of any type of computer memory that is located either internally or externally (e.g., networked or peripheral), for example, hard drives, flash memory, solid state memory, network storage devices, random-access memory (RAM), cache memory, read-only memory (ROM), Blu-ray™ or compact disc read-only memory (CDROM), electro-optical memory, magneto-optical memory, erasable programmable read-only memory (EPROM), and electrically-erasable programmable read-only memory (EEPROM), Ferroelectric RAM (FRAM), non-transitory computer readable media or the like.

In some examples, memory devices 1420 may include data or instruction sets for configuring one or more processors and other components of the machines 1401 or computing system 1400 to perform any of the methods and functions described herein.

Some input/output (I/O) interfaces 1430 can enable a machine 1401 or system 1400 to interconnect with one or more input devices, such as a keyboard, mouse, camera, touch screen and a microphone, or with one or more output devices such as a display screen or a speaker. In some embodiments, I/O interfaces 1430 can also include network interfaces which enable machines 1401 or aspects of the computing system 1400 to communicate with other components, to exchange data with other components, to access and connect to network resources, to serve applications, and to perform other computing applications by connecting to one or more wired or wireless networks capable of carrying data including the Internet, Ethernet, plain old telephone service (POTS) line, public switched telephone network (PSTN), integrated services digital network (ISDN), digital subscriber line (DSL), coaxial cable, fiber optics, satellite, mobile, wireless (e.g., Wi-Fi, WiMAX), SS7 signaling network, Bluetooth™, near field communication (NFC), fixed line, local area network, wide area network, busses and others, including any combination of these.

In some embodiments, machines 1401 and/or computing system 1400 may include input or output devices such as keyboard, mouse, camera, touch screen, microphone, displays, etc. For example, a computing device or printing device may include a keypad, touchscreen, or other integrated, peripheral or linked input or output device. The input devices may be configured to receive instructions to access or modify files, or to change file system parameters. The output devices may be configured to display or otherwise output file system information.

Embodiments disclosed herein may be implemented using hardware, software or some combination thereof. Based on such understandings, the technical solution may be embodied in the form of a software product. The software product may be stored in a non-volatile or non-transitory storage medium, which can be, for example, a compact disk read-only memory (CD-ROM), USB flash disk, a removable hard disk, flash memory, hard drive, or the like. The software product includes a number of instructions that enable a computing device (computer, server, mainframe, or network device) to execute the methods provided herein.

Program code may be applied to input data to perform the functions described herein and to generate output information. The output information is applied to one or more output devices. In some embodiments, the communication interface may be a network communication interface. In embodiments in which elements are combined, the communication interface may be a software communication interface, such as those for inter-process communication. In still other embodiments, there may be a combination of communication interfaces implemented as hardware, software, and/or combination thereof.

Each computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

The present disclosure may make numerous references to servers, services, interfaces, portals, platforms, or other systems formed from hardware devices. It should be appreciated that the use of such terms is deemed to represent one or more devices having at least one processor configured to execute software instructions stored on a computer readable tangible, non-transitory medium. One should further appreciate the disclosed computer-based algorithms, processes, methods, or other types of instruction sets can be embodied as a computer program product comprising a non-transitory, tangible computer readable media storing the instructions that cause a processor to execute the disclosed steps.

Various example embodiments are described herein. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments described herein are implemented by physical computer hardware embodiments. The embodiments described herein provide useful physical machines and particularly configured computer hardware arrangements of computing devices, servers, processors, memory, networks, for example. The embodiments described herein, for example, are directed to computer apparatuses, and methods implemented by computers through the processing and transformation of electronic data signals.

The embodiments described herein may involve computing devices, servers, receivers, transmitters, processors, memory(ies), displays, networks particularly configured to implement various acts. The embodiments described herein are directed to electronic machines adapted for processing and transforming electromagnetic signals which represent various types of information. The embodiments described herein pervasively and integrally relate to machines and their uses; the embodiments described herein have no meaning or practical applicability outside their use with computer hardware, machines, a various hardware components.

Substituting the computing devices, servers, receivers, transmitters, processors, memory, display, networks particularly configured to implement various acts for non-physical hardware, using mental steps for example, may substantially affect the way the embodiments work.

Such hardware limitations are clearly essential elements of the embodiments described herein, and they cannot be omitted or substituted for mental means without having a material effect on the operation and structure of the embodiments described herein. The hardware is essential to the embodiments described herein and is not merely used to perform steps expeditiously and in an efficient manner.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for managing replication of files of distinct file systems, each file system at a different location and comprising files distributed over at least one machine at the different location, the method comprising:
receiving, by a replicator device between a first file and a second file system of the distinct file systems, event data associated with file system events, each file system event of the file system events related to a modification of at least one file located at the first file system of the distinct file systems;
for the each file system event of the file system events:
generating, by the replicator device, at least one file system action to be executed at the second file system of the distinct file systems to replicate the modification of the at least one file located at the first file system, wherein the at least one file system action causes the modification of the at least one file located at the first file system to be applied to a replica of the at least one file located at the second file system; and
storing, by the replicator device, the at least one file system action for the file system event in an action buffer;
determining, by the replicator device, that a number of file system actions in the action buffer exceeds a size threshold number in a batch optimization trigger;
in response to the determining:
identifying, by the replicator device, dependencies between the file system actions in the action buffer that are rename events or unlink events, wherein a rename event indicates that a file located at the first file system has been renamed and an unlink event indicates that the file located at the first file system has been deleted;
organizing, by the replicator device, the file system actions stored in the action buffer without violating the identified dependencies between file system actions;
scheduling, by the replicator device, the file system actions stored in the action buffer for execution based on the dependencies; and
communicating, by the replicator device, the scheduled file system actions to the second file system for execution at the second file system.

2. The method of claim 1, wherein scheduling the file system actions in the action buffer for execution comprises:
upon determining that all dependencies for a particular file system action in the action buffer have been resolved, identifying the particular file system action as ready for execution; and
scheduling the particular file system action in the action buffer identified as ready for execution.

3. The method of claim 1, comprising:
receiving an execution response message regarding an execution or attempted execution of a scheduled file system action; and
updating the action buffer based on the received execution response message.

4. The method of claim 3, wherein updating the action buffer based on the received execution response message comprises:
when the received execution response message indicates that execution of one of the scheduled file system actions was successful, resolving a dependency for at least one file system action in the action buffer that depended on one scheduled file system action that was successful.

5. The method of claim 1, comprising:
upon determining one of the file system events associated with the received event data indicates that content data of at least one file located at the first file system is being modified:
monitoring a length of the content data being modified; and
generating a copy chunk action when the length of the content data being modified indicates that a new chunk of modified content data having a defined chunk size is available for copying, the copy chunk action to replicate the new chunk of modified content data located at the second file system.

6. The method of claim 1, comprising:
upon determining one of the file system events associated with the received event data indicates that content data of at least one file located at the first file system is being modified:
generating an initial copy chunk action to replicate an initially available portion of the modified content data at the first file system; and
generating a subsequent copy chunk action to replicate a next available portion of the modified content data when an execution response message is received indicating that a previous copy chunk action to replicate the content data was successful.

7. The method of claim 1, wherein generated actions comprise file location information for the at least one file located at the first file system.

8. The method of claim 1, wherein organizing comprises reordering one or more file system actions in the action buffer.

9. The method of claim 1, wherein organizing comprises combining or eliminating one or more related actions stored in the action buffer, wherein two or more actions are related when at least one file is involved in each of the two or more actions.

10. The method of claim 9, comprising: delaying the combining or eliminating of the one or more related actions until the batch optimization trigger is detected.

11. The method of claim 1,
wherein the event data includes first modification event data associated with a first modification event for modifying a first file at the first file system,
wherein the file system actions include a first modification action for modifying a first replica of the first file at the second file system,
wherein the method further comprises receiving a first close event associated with closing the first file at the first file system after the modifying the first file, and
wherein the scheduling comprises scheduling the first modification action such that the first modification action is communicated to the second file system for execution at the second file system before the receiving the first close event.

12. A system for managing replication of files of distinct file systems, each file system at a different location and comprising files distributed over at least one machine at the different location, the system comprising:
  at least one processor configured for:
    receiving, by the system between a first file system and a second file system of the distinct file systems, event data associated with file system events, each file system event of the file system events related to a modification of at least one file located at the first file system of the distinct file systems;
    for the each file system event of the file system events:
      generating at least one file system action to be executed at the second file system of the distinct file systems to replicate the modification of the at least one file located at the first file system, wherein the at least one file system action causes the modification of the at least one file located at the first file system to be applied to a replica of the at least one file located at the second file system;
      storing the at least one file system action for the file system event in an action buffer;
    determining that a number of file system actions in the action buffer exceeds a size threshold number in a batch optimization trigger;
    in response to the determining:
      identifying dependencies between the file system actions in the action buffer that are rename events or unlink events, wherein a rename event indicates that a file located at the first file system has been renamed and an unlink event indicates that the file located at the first file system has been deleted;
      organizing the file system actions stored in the action buffer without violating the identified dependencies between file system actions;
      scheduling the file system actions in the action buffer based on the dependencies; and
      communicating the scheduled file system actions to the second file system for execution at the second file system.

13. The system of claim 12, wherein scheduling the file system actions in the action buffer for execution comprises:
  upon determining that all dependencies for a particular file system action in the action buffer have been resolved, identifying the particular file system action as ready for execution; and
  scheduling the particular file system action in the action buffer identified as ready for execution.

14. The system of claim 12, wherein the at least one processor is configured for:
  receiving an execution response message regarding an execution or attempted execution of a scheduled file system action; and
  updating the action buffer based on the received execution response message.

15. The system of claim 14, wherein updating the action buffer based on the received execution response message comprises:
  when the received execution response message indicates that execution of one of the scheduled file system actions was successful, resolving a dependency for at least one file system action in the action buffer that depended on the one scheduled file system action that was successful.

16. The system of claim 12, wherein the at least one processing is configured for: upon determining one or the file system events associated with the received event data indicates that content data of at least one file located at the first file system is being modified:
  monitoring a length of the content data being modified; and
  generating a copy chunk action when the length of the content data being modified indicates that a new chunk of modified content data having a defined chunk size is available for copying, the copy chunk action to replicate the new chunk of modified content data located at the second file system.

17. The system of claim 12, wherein the at least one processing is configured for:
  upon determining one of the file system events associated with the received event data indicates that content data of at least one file located at the first file system is being modified:
  generating an initial copy chunk action to replicate an initially available portion of the modified content data at the first file system; and
  generating a subsequent copy chunk action to replicate a next available portion of the modified content data when an execution response message is received indicating that a previous copy chunk action to replicate the content data was successful.

18. The system of claim 12, wherein generated actions comprise file location information for the at least one file located at the first file system.

19. The system of claim 12, wherein organizing comprises reordering, combining or eliminating one or more related actions in the action buffer, wherein two or more actions are related when at least one file is involved in each of the two or more actions.

20. The system of claim 19, wherein the at least one processing is configured for: delaying the reordering, combining or eliminating of the one or more related actions until a batch optimization trigger is detected.

21. A non-transitory, computer-readable medium or media having stored computer-readable instructions thereon for managing replication of files of distinct file systems, each file system at a different machine location and comprising files distributed over at least one machine at the different machine location, the computer-readable instructions, when executed by at least one processor of a replicator device between a first file system and a second file system of the distinct file systems, configure the at least one processor for:
  receiving event data associated with file system events, each file system event of the file system events related to a modification of at least one file located at the first file system of the distinct file systems;
  for the each file system event of the file system events:
    generating at least one file system action to be executed at the second file system of the distinct file systems to replicate the modification of the at least one file located at the first file system, wherein the at least one file system action causes the modification of the at least one file located at the first file system to be applied to a replica of the at least one file located at the second file system; and
    storing the at least one generated file system action in an action buffer;
  determining, by the replicator device, that a number of file system actions in the action buffer exceeds a size threshold number in a batch optimization trigger;
  in response to the determining:
    identifying dependencies between the file system actions in the action buffer that are rename events or unlink events, wherein a rename event indicates that a file located at the first file system has been renamed and an unlink event indicates that the file located at the first file system has been deleted;

organizing the file system actions stored in the action buffer without violating the identified dependencies between file system actions;

scheduling the file system actions in the action buffer based on the dependencies; and communicating the scheduled file system actions to the second file system for execution at the second file system.

* * * * *